(12) United States Patent
Sen

(10) Patent No.: US 11,941,059 B2
(45) Date of Patent: *Mar. 26, 2024

(54) SYSTEMS AND METHODS FOR GENERATING A SEARCH QUERY USING FLEXIBLE AUTOCOMPLETE MENUS

(71) Applicant: Rovi Guides, Inc., San Jose, CA (US)

(72) Inventor: Susanto Sen, Karnataka (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/899,046

(22) Filed: Aug. 30, 2022

(65) Prior Publication Data

US 2022/0414158 A1 Dec. 29, 2022

Related U.S. Application Data

(63) Continuation of application No. 16/819,531, filed on Mar. 16, 2020, now Pat. No. 11,468,121.

(51) Int. Cl.
*G06F 16/9032* (2019.01)
*G06F 16/16* (2019.01)
*G06F 16/903* (2019.01)
*G06F 16/9038* (2019.01)

(52) U.S. Cl.
CPC ...... *G06F 16/90324* (2019.01); *G06F 16/168* (2019.01); *G06F 16/90335* (2019.01); *G06F 16/9038* (2019.01)

(58) Field of Classification Search
CPC ............. G06F 16/90324; G06F 16/168; G06F 16/90335; G06F 16/9038; G06F 16/7328
See application file for complete search history.

(56) References Cited

U.S. PATENT DOCUMENTS

| | | | | |
|---|---|---|---|---|
| 7,917,528 B1* | 3/2011 | Dave | ................... | G06F 16/3322 707/766 |
| 8,332,748 B1* | 12/2012 | Karam | ................ | G06F 16/3338 715/780 |
| 8,601,019 B1* | 12/2013 | Weininger | ........ | G06F 16/90324 707/769 |
| 9,245,029 B2 | 1/2016 | Musgrove | | |

(Continued)

OTHER PUBLICATIONS

PCT International Search Report for International Application No. PCT/US2020/065678, dated Mar. 16, 2021 (13 pages).

*Primary Examiner* — Rami R Okasha
(74) *Attorney, Agent, or Firm* — Haley Guiliano LLP

(57) ABSTRACT

Systems and methods are described herein for generating a search query using flexible autocomplete suggestions. A text input is received, and a plurality of portions of the text input, each corresponding to a different search parameter, are identified. For each of the identified portions, at least one suggested alternate text is retrieved based on the corresponding attribute, and a user interface element is generated for display in which the original text of the respective portion is displayed, along with the suggested alternate texts for that portion, which are selectable by the user. Upon receiving selection of a suggested alternate text in at least one user interface element, a search query is generated based on each portion for which no alternate has been selected, and each selected alternate text. Search request are retrieved in response to the search query, and the results are generated for display to the user.

16 Claims, 10 Drawing Sheets

(56) References Cited

U.S. PATENT DOCUMENTS

| | | | | |
|---|---|---|---|---|
| 9,251,206 B2* | 2/2016 | Ciaramita | ......... | G06F 16/90324 |
| 9,652,541 B1 | 5/2017 | Amacker et al. | | |
| 2011/0093488 A1* | 4/2011 | Amacker | ................ | H04L 67/02 |
| | | | | 707/E17.014 |
| 2012/0084312 A1* | 4/2012 | Jenson | ............... | G06F 16/90324 |
| | | | | 707/E17.014 |
| 2012/0246173 A1* | 9/2012 | Wittmer | ................ | G06F 16/338 |
| | | | | 707/E17.069 |
| 2012/0296926 A1 | 11/2012 | Kalin et al. | | |
| 2013/0226953 A1* | 8/2013 | Markovich | ....... | G06F 16/90324 |
| | | | | 707/767 |
| 2014/0082550 A1* | 3/2014 | Farmer | ................ | G06F 16/242 |
| | | | | 715/781 |
| 2014/0172814 A1* | 6/2014 | Yuen | .................... | G06F 16/951 |
| | | | | 707/706 |
| 2014/0280290 A1 | 9/2014 | Baumgartner et al. | | |
| 2014/0280291 A1* | 9/2014 | Collins | ............. | G06F 16/90324 |
| | | | | 707/767 |
| 2015/0161291 A1* | 6/2015 | Gur | ................... | G06F 16/90332 |
| | | | | 707/722 |
| 2015/0269176 A1* | 9/2015 | Marantz | ........... | G06F 16/90324 |
| | | | | 707/767 |
| 2015/0317310 A1 | 11/2015 | Glass et al. | | |
| 2015/0317320 A1* | 11/2015 | Miller | ............... | G06F 16/90324 |
| | | | | 707/728 |
| 2016/0239569 A1* | 8/2016 | Levy | ...................... | G06F 16/285 |
| 2017/0242913 A1* | 8/2017 | Tijssen | .................. | G06F 40/279 |
| 2019/0272296 A1 | 9/2019 | Prakash et al. | | |
| 2020/0265094 A1* | 8/2020 | Liu | ................... | G06F 16/90332 |
| 2021/0019309 A1 | 1/2021 | Yadav et al. | | |
| 2021/0286850 A1 | 9/2021 | Sen | | |

\* cited by examiner

|  | 202a | 202b | 202c | 202d |
|---|---|---|---|---|
|  | Johnny Depp<br>Keanu Reeves<br>Daniel Craig | romance<br>comedy | series | 90s |
| 200 → | Tom Cruise | action | movies | recent |
| 204 → | Will Smith<br>Brad Pitt<br>Robert Downey Jr. | buddy<br>thriller | download<br>streaming | latest |

↓

|  | 208a | 208b | 208c | 208d |
|---|---|---|---|---|
|  | Martin Lawrence<br>Dave Chappelle | western<br>comedy | series | 00s |
| 206 → | Will Smith | action | movies | recent |
|  | Eddy Murphy<br>Kevin Hart | buddy<br>thriller | streaming | latest<br>90s |

FIG. 2

| | | | | |
|---|---|---|---|---|
| Johnny Depp<br>Keanu Reeves<br>Daniel Craig | romance<br>comedy | series | 90s | |
| Tom Cruise | action | movies | recent | ← 300 |
| Will Smith | buddy<br>thriller | download<br>streaming | latest | ← 302 |
| Brad Pitt<br>Robert Downey Jr. | | | | |

↓

| | | | | |
|---|---|---|---|---|
| Martin Lawrence<br>Dave Chappelle | western<br>comedy | series | 00s | |
| Will Smith | action | movies | recent | ← 304 |
| Tom Cruise | buddy<br>thriller | streaming | latest<br>90s | ← 308 |
| Eddy Murphy<br>Kevin Hart | | | | |

FIG. 3

SYSTEMS AND METHODS FOR GENERATING A SEARCH QUERY USING FLEXIBLE AUTOCOMPLETE MENUS

CROSS-REFERENCE TO RELATED APPLICATION

This application is a continuation of U.S. patent application Ser. No. 16/819,531, filed Mar. 16, 2020, the disclosure of which is incorporated by reference in its entirety.

BACKGROUND

This disclosure relates to electronic searches for content and, in particular, providing autocomplete options for search queries.

SUMMARY

When performing a search, a user may enter a first search query and receive a first set of search results. The user may then wish to alter a parameter of the search query to broaden, narrow, or otherwise alter the scope of the search. Existing search systems often provide autocomplete suggestions while the user is entering text, which may be based on the user's preferences or on searches most often performed by other users. Such suggestions generally offer to complete the entire search query for the user, and do not allow for easy modification of any parameter without requiring the user to manually delete and enter various terms of the search query. Existing systems also generally provide only a small number of suggested completed search queries from which the user may select. This greatly limits the ability of existing search systems to provide robust autocomplete suggestions.

Systems and methods are described herein for generating a search query using flexible autocomplete suggestions. A text input is received, and a plurality of portions of the text input, each corresponding to a different attribute or search parameter, are identified. For each of the identified portions, at least one suggested alternate text is retrieved based on the attribute corresponding to the identified portion, and a user interface element is generated for display in which the original text of the respective portion is displayed, along with the suggested alternate texts for that portion, which are selectable by the user. Upon receiving selection of a suggested alternate text in at least one user interface element, a search query is generated based on each portion for which no alternate has been selected, and each selected alternate text. Search request are retrieved in response to the search query, and the results are generated for display to the user.

The search query may be constructed based on the attribute corresponding to each of the plurality of portions and the text contained in the user interface element corresponding to each portion. For example, if a search query "Tom Cruise action movies recent" was entered, four portions may be identified: "Tom Cruise," "action," "movies," and "recent," corresponding to the attributes actor, genre, content type, and release date, respectively. A query may then be constructed for movies starring Tom Cruise in the action genre that were recently released. If an alternate text were selected, such as "Eddie Murphy" in place of "Tom Cruise," a query may be constructed for movies starring Eddie Murphy in the action genre that were recently released.

To identify suggested alternate texts, a second attribute associated with the portion may be identified, and alternate text associated with both the attribute corresponding to the portion and the second attribute are retrieved, for example, from a database of terms. Alternatively or additionally, alternate text associated with both attributes may be retrieved from a user profile. At least one suggested alternate text may be retrieved for each portion of the text input.

If more than one suggested alternate text is retrieved for a portion, the alternate texts may be displayed both above and below the original portion of the text input, with a first subset (e.g., half) of the suggested alternate texts displayed above, a remaining subset displayed below. In some cases, a relevance score for each alternate text is determined and each subset of alternate texts is ordered according to the relevance scores. The first subset of alternate texts may be displayed with a first alternate text having the highest relevance score of the first subset at the bottom, closest to the original portion of the text input, with the remaining alternate texts displayed above the first alternate text in order of decreasing relevance score. Similarly, the remaining subset of alternate texts may be displayed with a second alternate text having the highest relevance score of the second subset at the top, with the remaining alternate texts displayed below the second alternate text in order of decreasing relevance score.

Selection of an alternate text for a given portion of the text input may, in some embodiments, affect the suggested alternate texts for that portion. A second set of suggested alternate texts may be retrieved based on the selected alternate text and displayed to the user for selection either in place of or in addition to the first set of suggested alternate texts. The original text of the portion may also be displayed among the suggested alternate texts. This allows the user to easily go back to a previous option. If selection of an alternate text of the second set of alternate texts is received, a third set of alternate texts may be retrieved and displayed.

In some embodiments, selection of an alternate text for one portion of the text affects the suggested alternate texts for other portions of the text. For example, if an alternate genre is selected, the set of suggested alternate actors may change based on what actors have been in content that falls in the selected genre.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows a second exemplary user interface for presentation of and interaction with flexible autocomplete menus, in accordance with some embodiments of the disclosure;

FIG. 3 shows a third exemplary user interface for presentation of and interaction with flexible autocomplete menus, in accordance with some embodiments of the disclosure;

DETAILED DESCRIPTION

Figure 1:
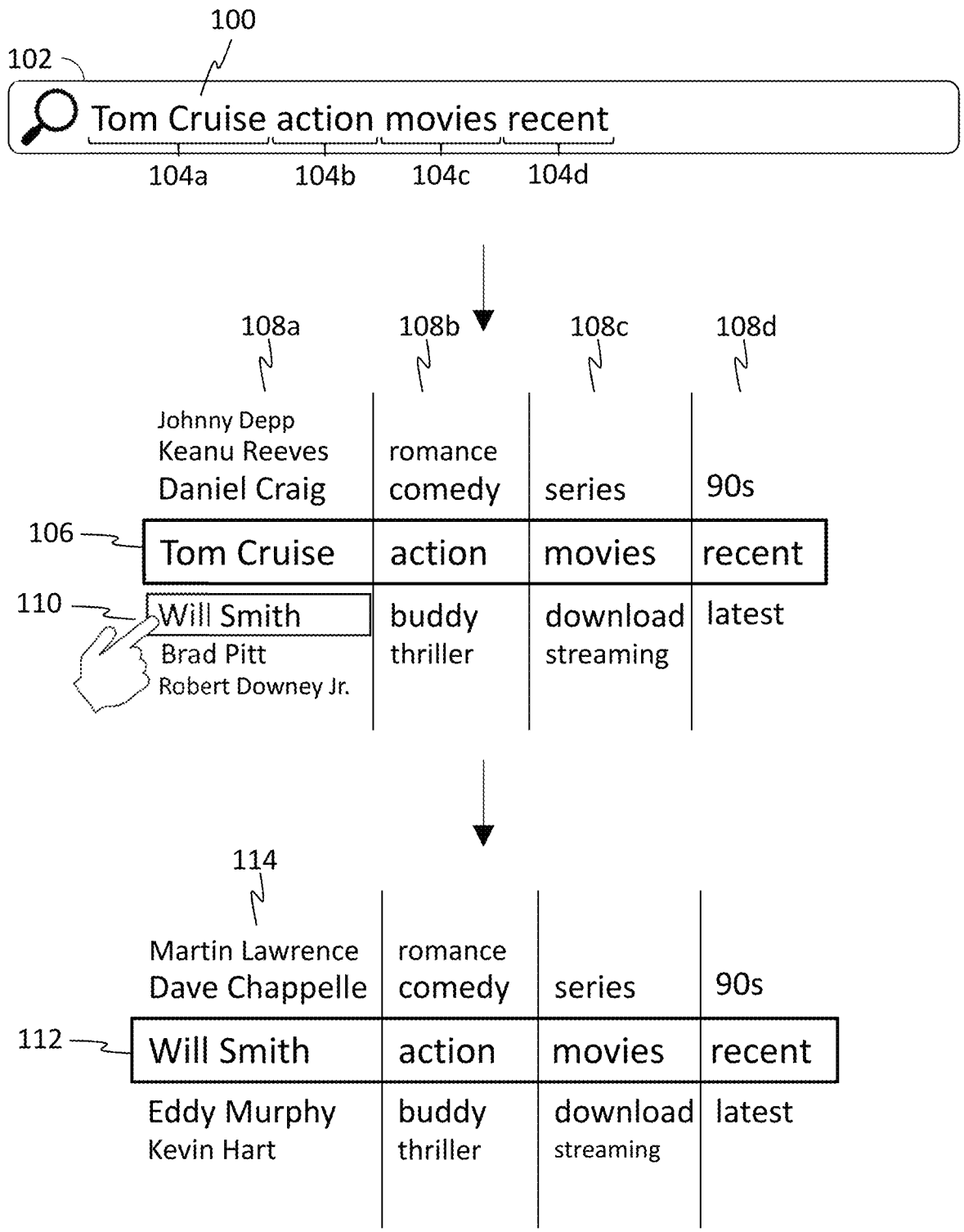
FIG. 1 shows an exemplary user interface for presentation of and interaction with flexible autocomplete menus, in accordance with some embodiments of the disclosure.

FIGS. 1-3 show various exemplary user interfaces for presentation of and interaction with flexible autocomplete menus, in accordance with some embodiments of the disclosure. Referring first to FIG. 1, text input 100 may be entered by a user in a search interface 102. Text input 100 may alternatively be a transcription of a voice input. Text input 100 may be a search for "Tom Cruise action movies recent." Text input 100 is processed to identify a number of distinct portions of the text. In this example, "Tom Cruise" is identified as portion 104a, "action" is identified as portion 104b, "movies" is identified as portion 104c, and "recent" is identified as portion 104d. A user interface is generated for display in which text input 100 is displayed as a set of individual search parameters 106. Suggested alternate texts for each portion are retrieved and displayed for selection by the user. Suggested alternate texts 108a for portion 104a are displayed above and below the corresponding parameter of parameter set 106. Each portion may correspond to a different attribute or parameter of the search intended to be performed by the user. Suggested alternate texts 108b are displayed above and below the parameter of parameter set 106 corresponding to portion 104b, suggested alternate texts 108c are displayed above and below the parameter corresponding to portion 104c, and suggested alternate texts 108d are displayed above and below the parameter corresponding to portion 104d. The user may select a suggested alternate text 110 "Will Smith" as an alternate parameter for "Tom Cruise." In response, parameter set 112 reflects the selection and a new set of suggested alternate texts 114 is displayed in place of suggested alternate texts 108a.

Selection of a suggested alternate text for one portion of a text input may, in some embodiments, affect the suggested alternate text presented to the user for one or more other portions of the text input. FIG. 2 shows a parameter set 200 representing the text input "Tom Cruise action movies recent" and suggested alternate texts 202a, 202b, 202c, and 202d for each portion. Upon selection of suggested alternate text 204 "Will Smith" as an alternate parameter for "Tom Cruise," parameter set 206 is displayed reflecting the user's selection and suggested alternate texts 208a, 208b, 208c, and 208d are displayed. For example, while Tom Cruise may star in romance movies and may never have been in a western movie. Will Smith may never have been in a romance movie, but may have been in a western movie. Thus, suggested alternate texts 208b differ from suggested alternate texts 202b by removing "romance" but including "western." Similarly, while some Tom Cruise movies may currently be available for download, no Will Smith movies may be available for download. Thus, suggested alternate texts 208c remove "download" as an option. Content available starring each actor may also have different release dates, resulting in the changes to suggested alternate texts 208d.

In some embodiments, the previously selected or originally entered portion of text is also displayed among the suggested alternate texts. In FIG. 3, parameter set 300 represents the text input "Tom Cruise action movies recent." Upon selection of suggested alternate text 302 "Will Smith," parameter set 304 is displayed reflecting the selection. Among the suggested alternate texts displayed for "Will Smith," suggested alternate text 308 "Tom Cruise" is displayed. In some cases, because it represents the previously selected text for that parameter, suggested alternate text 308 may be displayed with a different appearance from that of other suggested alternate texts. This may provide the user with a visual reminder of his or her previous search in case he or she wishes to return to that search.

Figure 4:
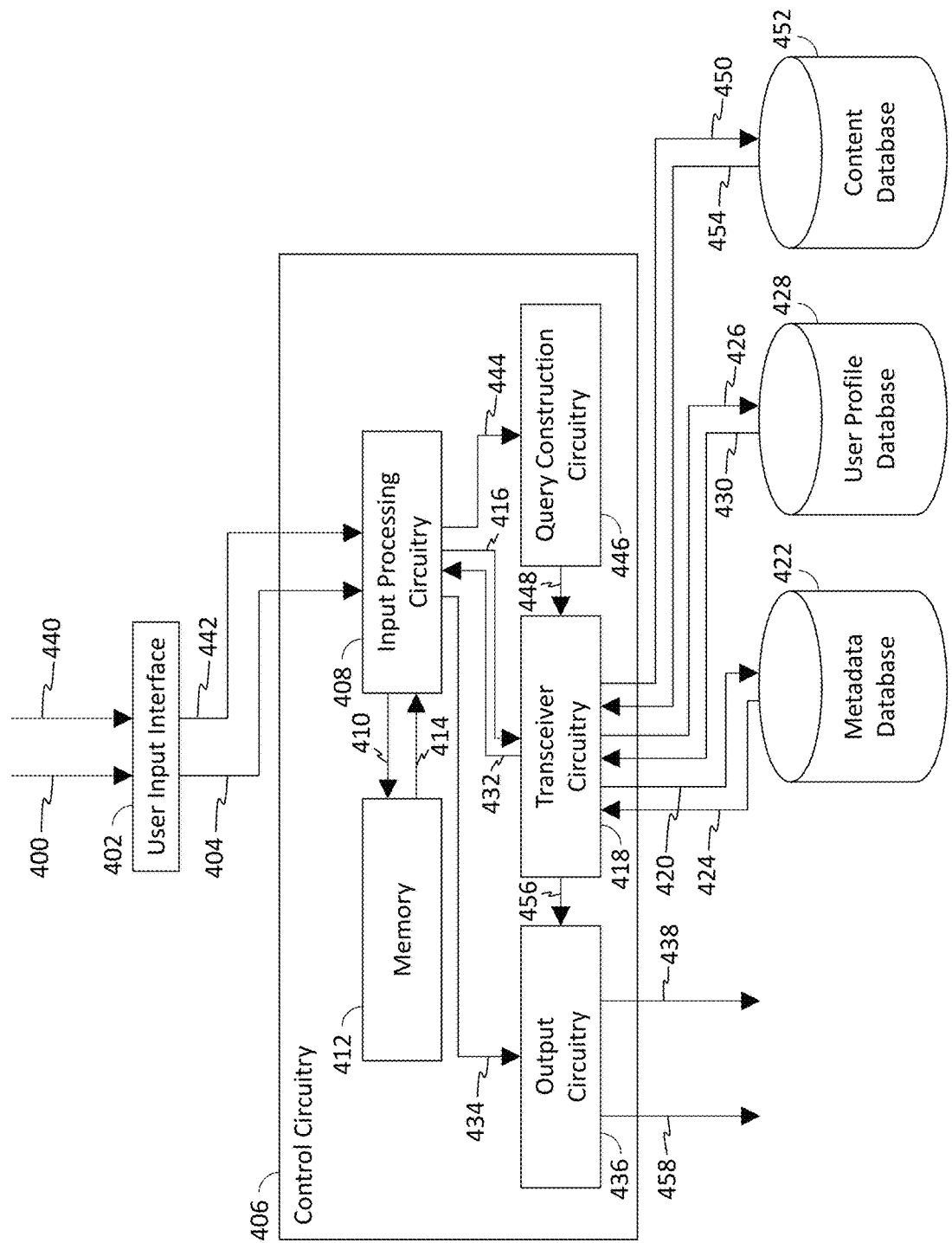
FIG. 4 is a block diagram representing components and data flow therebetween of a system for generating a search query using flexible autocomplete menus, in accordance with some embodiments of the disclosure.

FIG. 4 is a block diagram representing components and data flow therebetween of a system for generating a search query using flexible autocomplete menus, in accordance with some embodiments of the disclosure. A search input, such as text input 100, in received 400 using user input circuitry 402. User input circuitry 402 may be a keyboard or touchscreen interface. Alternatively, user input circuitry 402 may comprise a wired (e.g., Ethernet) or wireless (e.g., WiFi, Bluetooth) data connection through which a user input is received from a user device or other device through which the user input is relayed, such as an Amazon® Echo® or other smart home device. User input circuitry 402 transmits 404 the search input to control circuitry 406, where it is received using input processing circuitry 408. Control circuitry 406 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Input processing circuitry 408 processes the search input to identify individual portion of the search input. If the search input was received as a voice command, input processing circuitry 408 may first transcribe the voice command into a corresponding text string. Input processing circuitry 408 may include natural language processing circuitry or other linguistic analysis circuitry to identify parts of speech, phrases, proper nouns, or other linguistic features of the text input and determine an attribute or search parameter corresponding to each portion of the text input. Input processing circuitry may transmit 410 a request to memory 412 for suggested alternate texts for each identified portion of the text input. Memory 412 may be an electronic storage device such as random-access memory, read-only memory, hard drives, optical drives, solid state devices, quantum storage devices, or any other suitable fixed or removable storage devices, and/or any combination of the same. A database or other data structure may be stored in memory 412 containing metadata describing available content, relationships between various content items, actors, and other content descriptors, etc. In response to the request, suggested alternate texts may be received 414 from memory 412. Alternatively or additionally, input processing circuitry 408 may transmit 416 the request to transceiver circuitry 418. Transceiver circuitry 418 comprises a network connection over which data can be transmitted to and received from remote devices, such as an ethernet connection, WiFi connection, or connection employing any other suitable networking protocol. Transceiver circuitry 418 in turn transmits 420 the request to metadata database 422. Suggested alternate texts for each portion may be received 424 by transceiver circuitry 418 from metadata database 422. Transceiver circuitry 418 may also transmit 426 the request to user profile database 428. User provide database 428 may include user preference data identifying various suggested texts corresponding to content that the user has previously consumed, has consumed recently, or has consumed often. This may help to better tailor the suggested alternate texts for each portion to the user's preferences. The suggested alternate texts corresponding to the user's preferences are received 430 by transceiver circuitry 418 from user profile database 428. Transceiver circuitry 418 then transmits 432 all suggested texts received from either metadata database 422 or user profile database 428 to input processing circuitry 408. Input processing circuitry correlates the suggested alternate texts with their corresponding portions of the text input and transmits 434 the suggested alternate texts to output circuitry 436. Output circuitry 436 may be any video or graphics processing circuitry suitable for generating an image for display on display device associated with control circuitry 406. Output circuitry 436 then outputs 438 for display a user interface element corresponding to each portion of the text input and the suggested alternate texts for each portion.

A user may select a suggested alternate text for any portion of the text input for which suggested alternate texts are displayed. A user selection in received 440 using user input interface 402. For example, a user may click on a suggested alternate text using a mouse, a remote control, or other input device, or may tap a touchscreen interface. User input interface 402 then transmits 442 the selection to input processing circuitry 408. Input processing circuitry 408 replaces the appropriate portion of the text input with the selected suggested alternate text. Input processing circuitry 408 may repeat the process described above in order to retrieve and display new suggested alternate texts for the suggested alternate text selected by the user to replace the portion of the text input. Input processing circuitry 408 transmits 444 each portion of the text input that has not been altered, and each suggested alternate text currently selected, as well as the attribute or search parameter corresponding to each portion or suggested alternate text to query construction circuitry 446. Query construction circuitry 446 uses the text portions and selected suggested alternate texts and associated search parameters to generate a query, such as a SQL "SELECT" statement. For example, in response to receiving "Tom Cruise," "action," "movies," and "recent," and corresponding attributes "actor," "genre," "content_type," and "release_date," query construction circuitry 446 may determine the current date (e.g., Mar. 1, 2020) and generate a SQL statement "SELECT*FROM movies WHERE actor='Tom Cruise' AND genre='action' AND release_date>10/01/2019". Query construction circuitry 446 then transmits 448 the query to transceiver circuitry 418 which in turn transmits 450 the query to content database 452. Transceiver circuitry 418 receives 454, in response to the query, at least one content identifies from content database 452 corresponding to at least one content item matching the search parameters of the query. Transceiver circuitry 418 transmits 456 the content identifiers to output circuitry 436. Output circuitry 436 generates for display a list comprising the content identifiers from which the user can select, and outputs 458 the list to a display device.

Figure 5:
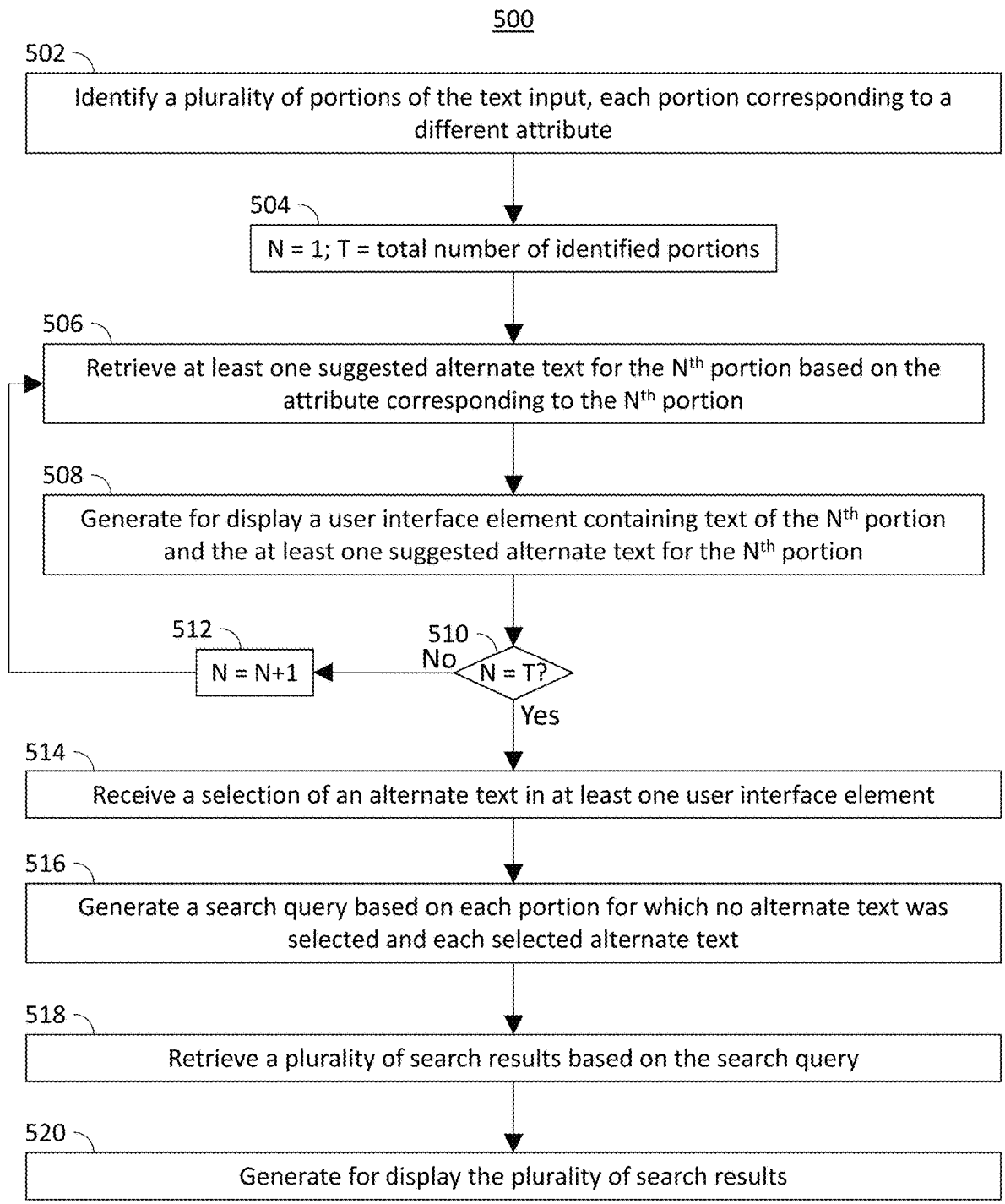
FIG. 5 is a flowchart representing a process for providing autocomplete suggestions in a search interface, in accordance with some embodiments of the disclosure.

FIG. 5 is a flowchart representing an illustrative process 500 for providing autocomplete suggestions in a search interface, in accordance with some embodiments of the disclosure. Process 500 may be implemented on control circuitry 406. In addition, one or more actions of process 500 may be incorporated into or combined with one or more actions of any process or embodiments described herein.

At 502, control circuitry 406 identifies a plurality of portions of the text input, each portion corresponding to a different attribute. For example, control circuitry 406, using input processing circuitry 408, first splits the text input in each constituent word. Control circuitry 406 then determines whether each word should be treated as its own portion of the text input, of if it is part of a larger phrase including at least the next word in the text input. Once all the portions have been identified, control circuitry 406 may determine a part of speech of each portion. If the portion is a proper noun consisting of two words, it may be identified as an actor name, and thus correspond to an "actor" attribute or search parameter. If the portion is a date or a temporal word (e.g., "recent," "latest," "last year"), the portion may be identified as corresponding to a "release date" attribute or search parameter.

At 504, control circuitry 406 initializes a counter variable N, settings its value to one, and a variable T representing the total number of identified portions. At 506, control circuitry 406 retrieves at least one suggested alternate text for the $N^{th}$ portion based on the attribute corresponding to the $N^{th}$ portion. For example, if the $N^{th}$ portion corresponds to an "actor" attribute, a list of actors may be retrieved as suggested alternate texts. The retrieved actor names may be those that are popular, trending, or preferred by the user. The retrieved actors may also be related to other portions attributes of the text input. For example, if a "genre" attribute is "action," then only actors who have appeared in that genre may be retrieved.

At 508, control circuitry 406 generates for display a user interface element containing text of the $N^{th}$ portion and the at least one suggested alternate text for the $N^{th}$ portion. For example, a selectable list of suggested alternate texts may be displayed. This may be accomplished using methods described below in connection with FIG. 8. At 510, control circuitry 406 determines whether N is equal to T, meaning that suggested alternate texts for all portions of the text input have been retrieved and generated for display. If N is not equal to T ("No" at 510") then, at 512, control circuitry 406 increments the value of N by one, and processing returns to step 506.

If N is equal to T ("Yes" at 510), then processing proceeds to step 5140, at which control circuitry 406 receives a selection of an alternate text in at least one user interface element. At 516, control circuitry 406 generates a search query based on each portion for which no alternate text was selected and each selected alternate text. For example, if the original text input was "Tom Cruise action movies recent"

and the user selected "Will Smith" as an alternate for "Tom Cruise" and "'00s" as an alternate for "recent," control circuitry 406 will generate a query based on "Will Smith," "action," "movies," and "'00s." This is described further below in connection with FIG. 6. At 518, control circuitry 406 retrieves a plurality of search results based on the query and, at 520, generates for display the plurality of search results.

The actions or descriptions of FIG. 5 may be used with any other embodiment of this disclosure. In addition, the actions and descriptions described in relation to FIG. 5 may be done in any suitable alternative orders or in parallel to further the purposes of this disclosure.

Figure 6:
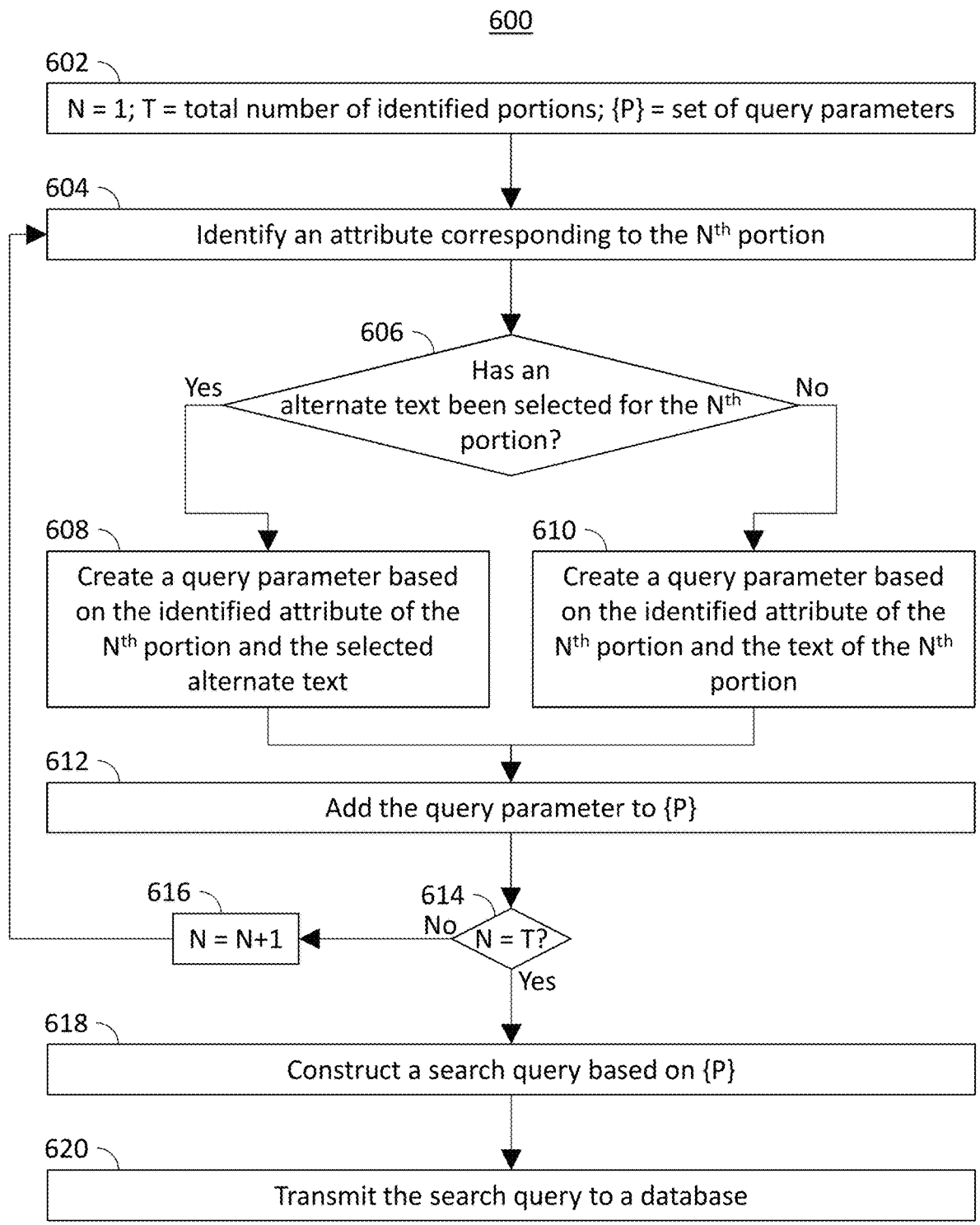
FIG. 6 is a flowchart representing a process for constructing a search query based on selections in flexible autocomplete menus, in accordance with some embodiments of the disclosure.

FIG. 6 is a flowchart representing an illustrative process 600 for constructing a search query based on selections in flexible autocomplete menus, in accordance with some embodiments of the disclosure. Process 600 may be implemented on control circuitry 406. In addition, one or more actions of process 600 may be incorporated into or combined with one or more actions of any process or embodiments described herein.

At 602, control circuitry 406 initializes a counter variable N, setting its value to one, a variable T representing the total number of identified portions, and a data structure or list variable {P} representing a set of query parameters. At 604, control circuitry 406 identifies an attribute corresponding to the $N^{th}$ portion. This may be accomplished using methods described above in connection with FIG. 5. At 606, control circuitry 406 determines whether an alternate text has been selected for the $N^{th}$ portion. If so ("Yes" at 606), then, at 608, control circuitry 406 creates a query parameter based on the identified attribute on the $N^{th}$ portion and the selected alternate text. If no alternate text has been selected for the $N^{th}$ portion ("No" at 606), then, at 610, control circuitry 406 creates a query parameter based on the identified attribute of the $N^{th}$ portion and the text of the $N^{th}$ portion. In either case, at 612, control circuitry 406 adds the created query parameter to {P}.

At 614, control circuitry 406 determines whether N is equal to T, meaning that all identified portions of the text input have been processed. If not ("No" at 614), then, at 616, control circuitry 406 increments the value of N by one, and processing returns to step 604. If N is equal to T ("Yes" at 614), then, at 618, control circuitry 406, using query construction circuitry 446, constructs a search query based on the parameters added to {P} and, at 620, transmits the search query to a database (e.g., content database 452).

The actions or descriptions of FIG. 6 may be used with any other embodiment of this disclosure. In addition, the actions and descriptions described in relation to FIG. 6 may be done in any suitable alternative orders or in parallel to further the purposes of this disclosure.

Figure 7:
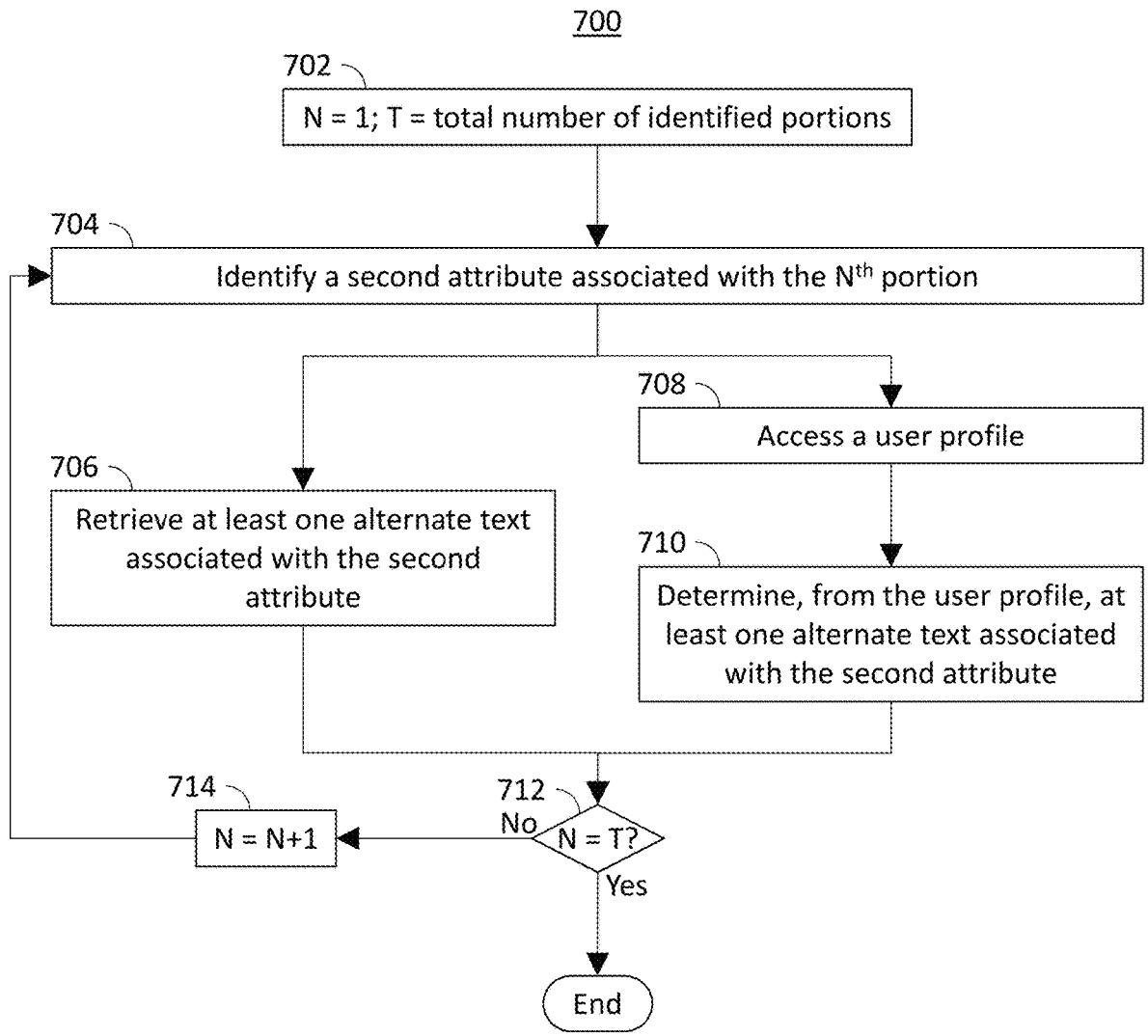
FIG. 7 is a flowchart representing a process for retrieving suggested alternate texts for an identified portion of a text input, in accordance with some embodiments of the disclosure.

FIG. 7 is a flowchart representing an illustrative process 700 for retrieving suggested alternate texts for an identified portion of a text input, in accordance with some embodiments of the disclosure. Process 700 may be implemented on control circuitry 406. In addition, one or more actions of process 700 may be incorporated into or combined with one or more actions of any process or embodiments described herein.

At 702, control circuitry 406 initializes a counter variable N, setting its value to one, and a variable T representing the total number of identified portions of the text input. At 704, control circuitry 406 identifies a second attribute associated with the $N^{th}$ portion. This may be accomplished using methods described above in connection with FIG. 5 for determining a first attribute associated with each portion. At 706, control circuitry 406 retrieves at least one alternate text associated with the second attribute. For example, in addition to determining that Tom Cruise is an actor, control circuitry 406 may determine that Tom Cruise is most closely associated with the action genre. Thus, in retrieving suggested alternate texts for "Tom Cruise," control circuitry 406 may retrieve the names of other actors who are also closely associated with the action genre.

Alternatively or additionally, at 708, control circuitry 406 accesses a user profile. The user profile may be stored locally, such as in memory 412, or remotely, such as in user profile database 428. At 710, control circuitry 406 determines, from the user profile, at least one alternate text associated with the second attribute. For example, the user may prefer action movies starring Nicholas Cage. Thus, control circuitry 406 may retrieve "Nicholas Cage" as a suggested alternate text for "Tom Cruise."

At 712, control circuitry 406 determines whether N is equal to T, meaning that all identified portions of the text input have been processed. If not ("No" at 712), then, at 714, control circuitry 406 increments the value of N by one, and processing returns to step 704. If N is equal to T ("Yes" at 712), then the process is complete.

The actions or descriptions of FIG. 7 may be used with any other embodiment of this disclosure. In addition, the actions and descriptions described in relation to FIG. 7 may be done in any suitable alternative orders or in parallel to further the purposes of this disclosure.

Figure 8:
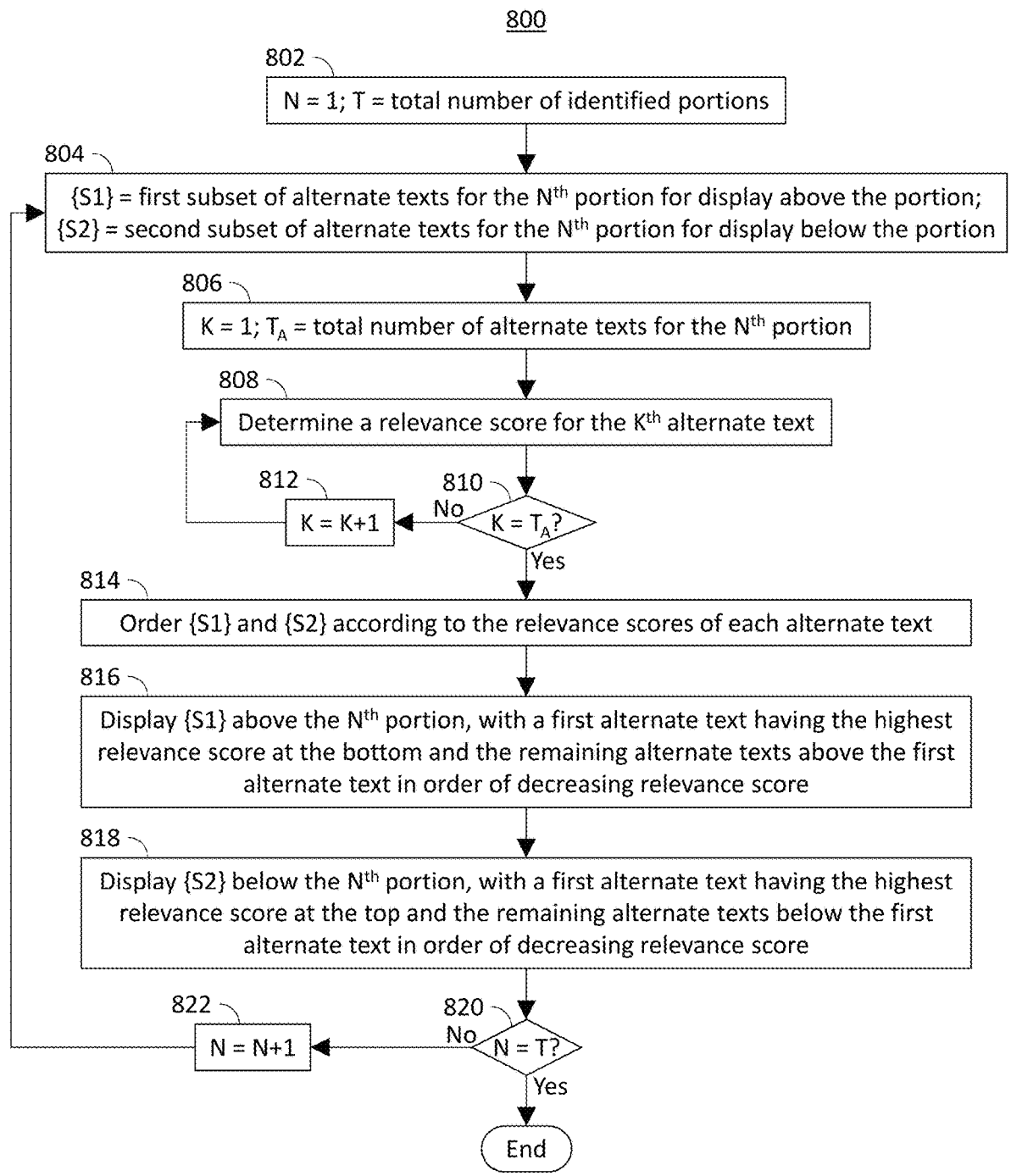
FIG. 8 is a flowchart representing a process for displaying suggested alternate texts for selection, in accordance with some embodiments of the disclosure.

FIG. 8 is a flowchart representing an illustrative process 800 for displaying suggested alternate texts for selection, in accordance with some embodiments of the disclosure. Process 800 may be implemented on control circuitry 406. In addition, one or more actions of process 800 may be incorporated into or combined with one or more actions of any process or embodiments described herein.

At 802, control circuitry 406 initializes a counter variable N, setting its value to one, and a variable T representing the total number of identified portions of the text input. At 804, control circuitry 406 initializes two data structures or list variable {S1} and {S2}. {S1} represents a first subset of alternate texts for the $N^{th}$ portion for display above the portion, while {S2} represents a second subset of alternate texts for the $N^{th}$ portion for display below the portion.

At 806, control circuitry 406 initializes a second counter variable K, settings its value to one, and a variable TA representing the total number of alternate texts for the $N^{th}$ portion of the text input. At 808, control circuitry 406 determines a relevance score for the $K^{th}$ alternate text. For example, control circuitry 406 may determine how closely the $K^{th}$ alternate text relates to the $N^{th}$ portion of the text input. For the portion "Tom Cruise," actors who have been in movies with Tom Cruise may be more important than actors that have not been in movies with Tom Cruise. Other portions of the text input may influence this determination, such as the "action" genre portion. For example, while a number of actors have been in movies with Tom Cruise, only some of those actors have been in other action movies. Actors who have also been in other action movies may therefore have higher relevance scores than actors that have not been in other action movies. At 810, control circuitry 406 determines whether K is equal to TA, meaning that all alternate texts for the $N^{th}$ portion have been processed. If not ("No" at 810), then, at 812, control circuitry 406 increments the value of K by one, and processing return to step 808. If K is equal to TA ("Yes" at 810), then, at 814, control circuitry 406 orders {S1} and {S2} according to the relevance scores of each alternate text. At 816, control circuitry 406 displays the suggested alternate texts contained in {S1} above the $N^{th}$ portion, with the alternate text having the highest relevance score at the bottom and the remaining alternate texts above that in decreasing order of relevance. Similarly, at 818, control circuitry 406 displays the alternate texts contained in{S2} below the $N^{th}$ portion, with the alternate text having the highest relevance score at the top and the remaining alternate texts below that in decreasing order of relevance.

At 820, control circuitry 406 determines whether N is equal to T, meaning that all identified portions of the text input have been processed. If not ("No" at 820), then, at 822, control circuitry increments that value of N by one, and processing returns to step 804. If N is equal to T ("Yes" at 820), then the process is complete.

The actions or descriptions of FIG. 8 may be used with any other embodiment of this disclosure. In addition, the actions and descriptions described in relation to FIG. 8 may be done in any suitable alternative orders or in parallel to further the purposes of this disclosure.

Figure 9:
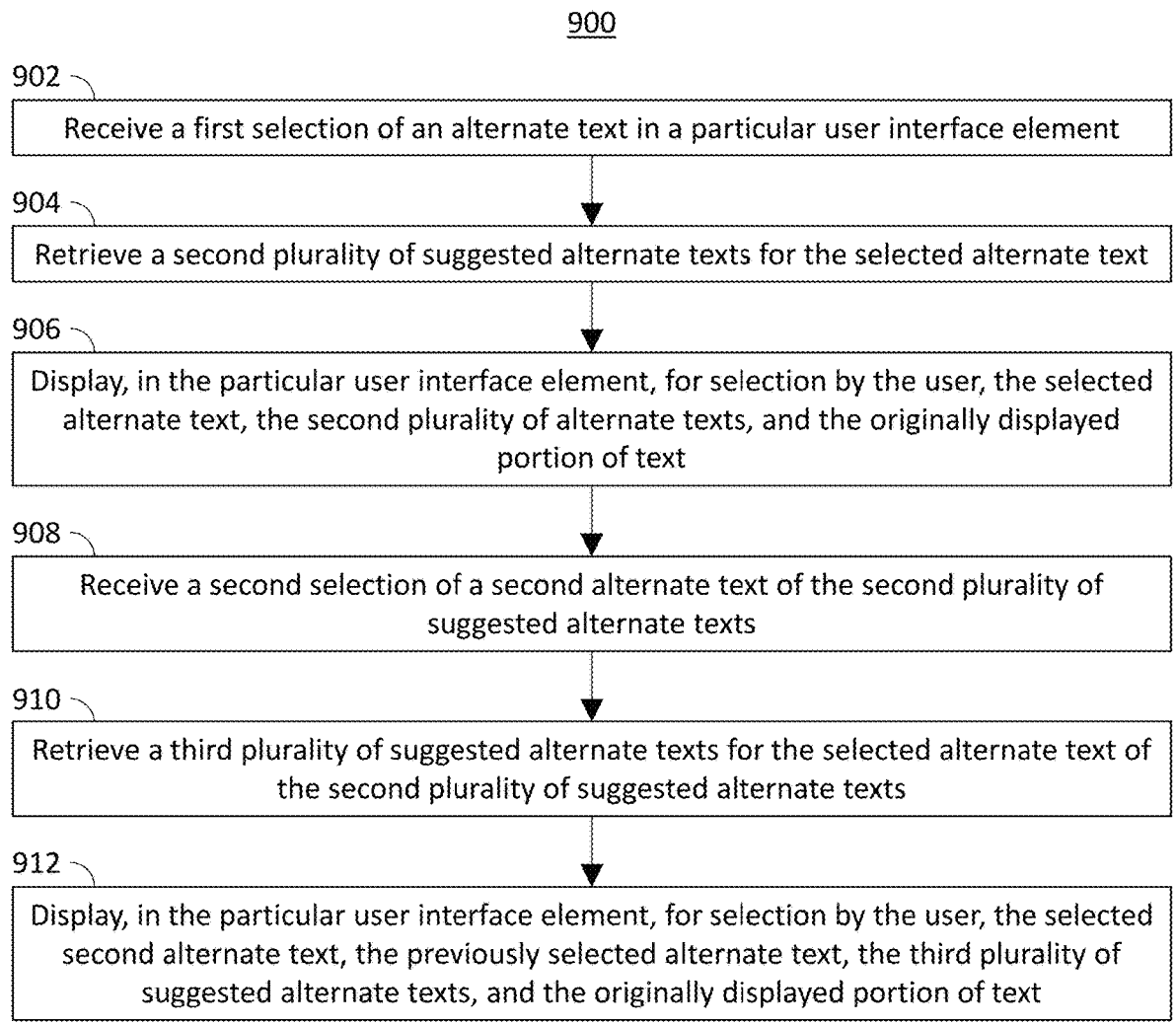
FIG. 9 is a flowchart representing a process for retrieving and displaying additional suggested alternate texts in response to selection of a first suggested alternate text, in accordance with some embodiments of the disclosure.

FIG. 9 is a flowchart representing an illustrative process 900 for retrieving and displaying additional suggested alternate texts in response to selection of a first suggested alternate text, in accordance with some embodiments of the disclosure. Process 900 may be implemented on control circuitry 406. In addition, one or more actions of process 900 may be incorporated into or combined with one or more actions of any process or embodiments described herein.

At 902, control circuitry 406 receives a first selection of an alternate text in a particular user interface element. For example, control circuitry 406 may receive, from user input interface 402, a mouse click or touchscreen interaction corresponding to selection of "Will Smith" as an alternate text for "Tom Cruise." At 904, control circuitry 406 retrieves a second plurality of suggested alternate texts for the selected alternate text. For example, using methods described above in connection with FIG. 5, control circuitry 406 may retrieve suggested alternate texts for "Will Smith" to be displayed in place of the suggested alternate texts for "Tom Cruise." At 906, control circuitry 406 displays, in the particular user interface element, for selection by the user, the selected alternate text, the second plurality of alternate texts, and the originally displayed portion of text. For example, display "Tom Cruise" as the current portion of text is replaced with display of "Will Smith" and display of the plurality of suggested alternate texts for "Tom Cruise" is replaced with display of the suggested alternate texts for "Will Smith" using methods described above in connection with FIG. 8. Additionally, included among the suggested alternate texts for "Will Smith" is "Tom Cruise" as an indication of the previously displayed portion of text.

At 908, control circuitry 406 receives a second selection of a second alternate text of the second plurality of suggested alternate texts. For example, control circuitry may receive selection of "Eddie Murphy" as an alternate text for "Will Smith." At 910, control circuitry 406 retrieves a third plurality of suggested alternate texts for the selected alternate text of the second plurality of suggested alternate texts. For example, control circuitry 406 retrieves a plurality of suggested alternate texts for "Eddie Murphy." At 912, control circuitry 406 displays, in the particular user interface element, for selection by the user, the selected second alternate text, the previously selected alternate text, the third plurality of suggested alternate texts, and the originally displayed portion of text. For example, upon selection of a suggested alternate text for "Eddie Murphy," control circuitry 406 display the newly selected alternate text as the current portion of text, the suggested alternate texts for that portion of text, and both "Eddie Murphy" and "Will Smith" and "Tom Cruise."

The actions or descriptions of FIG. 9 may be used with any other embodiment of this disclosure. In addition, the actions and descriptions described in relation to FIG. 9 may be done in any suitable alternative orders or in parallel to further the purposes of this disclosure.

Figure 10:
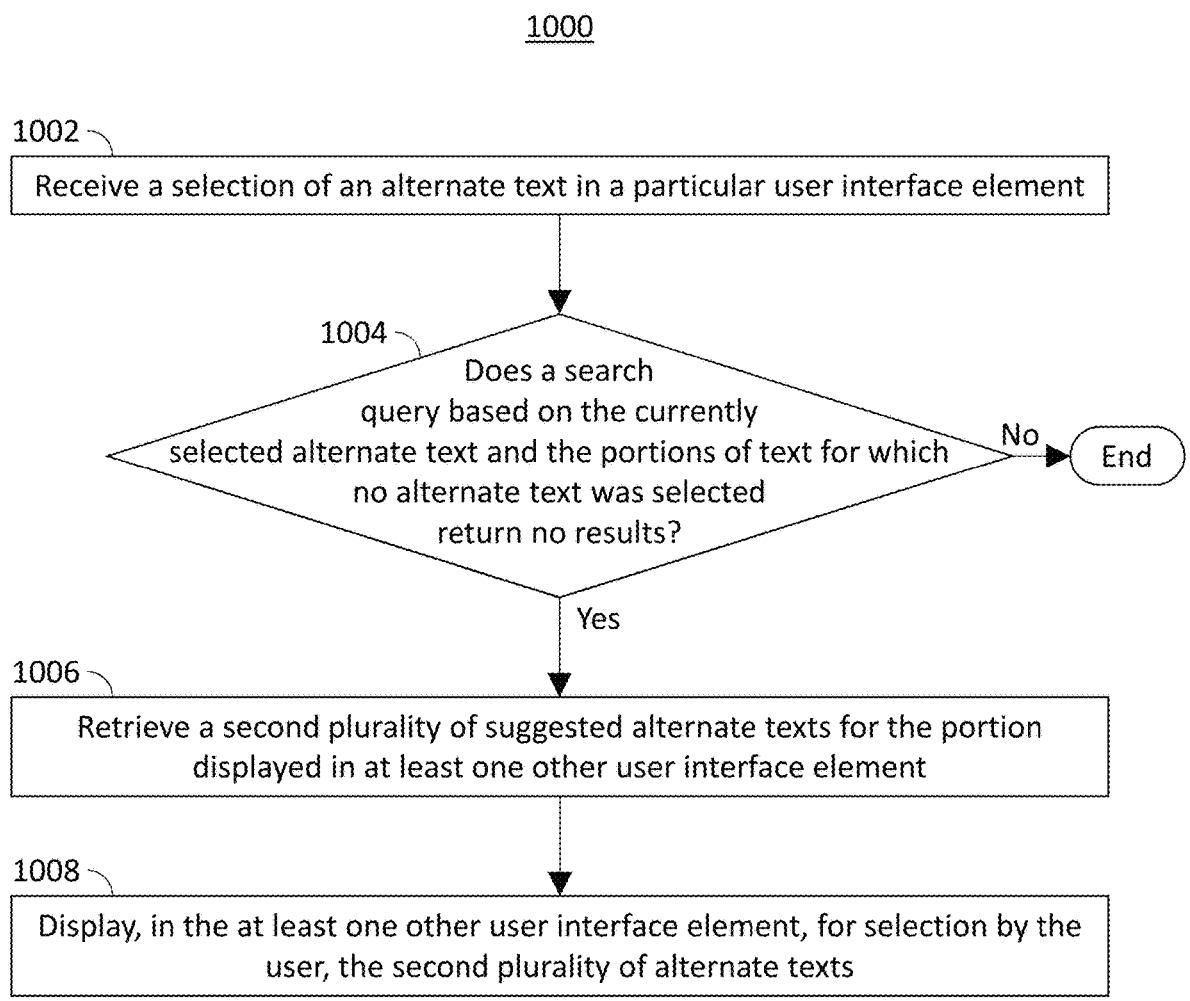
FIG. 10 is a flowchart representing a second process for retrieving and displaying additional suggested alternate texts in response to selection of a first suggested alternate text, in accordance with some embodiments of the disclosure.

FIG. 10 is a flowchart representing a second illustrative process 1000 for retrieving and displaying additional suggested alternate texts in response to selection of a first suggested alternate text, in accordance with some embodiments of the disclosure. Process 1000 may be implemented on control circuitry 406. In addition, one or more actions of process 1000 may be incorporated into or combined with one or more actions of any process or embodiments described herein.

At 1002, control circuitry 406 receives a selection of an alternate text in a particular user interface element. This may be accomplished using methods described above in connection with FIG. 9. At 1004, control circuitry 406 determines whether a search query based on the currently selected alternate text and the portions of text for which no alternate text was selected returns no results. If so ("Yes" at 1004), then, at 1006, control circuitry 406 retrieves a second plurality of suggested alternate texts for the portion displayed in at least one other user interface element and, at 1008, displays, in the at least one other user interface element, for selection by the user, the second plurality of alternate texts. For example, upon selection of "Will Smith" as an alternate for "Tom Cruise," control circuitry may determine whether there are any content items which match the search "Will Smith action movies recent." If not, control circuitry may retrieve a plurality of alternate texts for "recent" corresponding to release dates for action movies starring Will Smith. The suggested alternate texts are then displayed as selectable alternatives in the user interface element associated with the portion "recent."

The actions or descriptions of FIG. 10 may be used with any other embodiment of this disclosure. In addition, the actions and descriptions described in relation to FIG. 10 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing autocomplete suggestions in a search interface, the method comprising:
   receiving a voice input;
   generating a text input by transcribing the voice input;

identifying a plurality of portions of the text input, each portion corresponding to a different attribute;

for each portion of the plurality of portions:
retrieving a plurality of suggested alternate texts for the portion;
generating for simultaneous display a user interface element containing text of the portion and the suggested alternate texts for the portion, wherein the portion has a different appearance from the suggested alternate texts for the portion;
determining a relevance score for each alternate text of the plurality of suggested alternate texts;
ordering first and second subsets of alternate texts according to the relevance score of each alternate text;
wherein the first subset, displayed above the portion of the text input, arranges the alternate texts in descending order of relevance, with the most relevant at the bottom of the first subset, and
wherein the second subset, displayed below the portion of the text input, arranges the alternate texts in descending order of relevance, with the most relevant at the top of the second subset;

receiving at least one selection of an alternate text in at least one user interface element;
generating a search query based on each portion for which no alternate text was selected and the at least one selected alternate text;
retrieving a plurality of search results based on the search query;
generating for display the plurality of search results.

2. The method of claim 1, wherein: generating the search query comprises constructing the search query based on the attribute corresponding to each portion of the plurality of portions and the text contained in the user interface element corresponding to each portion of the plurality of portions; and wherein the method further comprises transmitting the search query to a database.

3. The method of claim 1, wherein retrieving the plurality of suggested alternate texts for the portion comprises: identifying a second attribute associated with the portion; and retrieving alternate text associated with both the text corresponding to the portion and the second attribute.

4. The method of claim 1, wherein retrieving the plurality of suggested alternate texts for the portion comprises: identifying a second attribute associated with the portion; accessing a user profile; and determining, from the user profile, an alternate text associated with both the attribute corresponding to the portion and the second attribute.

5. The method of claim 1, further comprising, in response to receiving a selection of an alternate text in a particular user interface element: retrieving a second plurality of suggested alternate texts for the selected alternate text; and displaying, in the particular user interface element, for selection by the user, the selected alternate text and the second plurality of alternate texts.

6. The method of claim 5, further comprising displaying, in the particular user interface element, for selection by the user, the portion of text originally displayed in the particular user interface element.

7. The method of claim 5, further comprising: receiving a second selection of a second alternate text of the second plurality of suggested alternate texts; retrieving a third plurality of suggested alternate texts for the selected second alternate text of the second plurality of suggested alternate texts; and displaying, in the particular user interface element, for selection by the user, the selected second alternate text, the previously selected alternate text, the third plurality of suggested alternate texts, and the portion of text originally displayed in the particular user interface.

8. The method of claim 1, further comprising, in response to receiving a selection of alternate text in a particular user interface element: retrieving a second plurality of suggested alternate texts for the portion displayed in at least one other user interface element; and displaying, in the at least one other user interface element, for selection by the user, the second plurality of alternate texts.

9. A system for providing autocomplete suggestions in a search interface the system comprising:
control circuitry configured to:
receive a voice input;
generate a text input by transcribing the voice input;
identify a plurality of portions of the text input, each portion corresponding to a different attribute;
for each portion of the plurality of portions:
retrieve a plurality of suggested alternate texts for the portion;
generate for simultaneous display a user interface element containing text of the portion and the suggested alternate texts for the portion, wherein the portion has a different appearance from the suggested alternate texts for the portion;
determine a relevance score for each alternate text of the plurality of suggested alternate texts;
order first and second subsets of alternate texts according to the relevance score of each alternate text;
wherein the first subset, displayed above the portion of the text input, arranges the alternate texts in descending order of relevance, with the most relevant at the bottom of the first subset, and
wherein the second subset, displayed below the portion of the text input, arranges the alternate texts in descending order of relevance, with the most relevant at the top of the second subset;
receive at least one selection of an alternate text in at least one user interface element;
generate a search query based on each portion for which no alternate text was selected and the at least one selected alternate text;
retrieve a plurality of search results based on the search query;
generate for display the plurality of search results.

10. The system of claim 9, wherein: the control circuitry configured to generate the search query is further configured to construct the search query based on the attribute corresponding to each portion of the plurality of portions and the text contained in the user interface element corresponding to each portion of the plurality of portions; and wherein the control circuitry is further configured to transmit the search query to a database.

11. The system of claim 9, wherein the control circuitry configured to retrieve the plurality of suggested alternate texts for the portion is further configured to: identify a second attribute associated with the portion; and retrieve alternate text associated with both the text corresponding to the portion and the second attribute.

12. The system of claim 9, wherein the control circuitry configured to retrieve the plurality of suggested alternate texts for the portion is further configured to: identify a second attribute associated with the portion; access a user profile; and determine, from the user profile, an alternate text associated with both the attribute corresponding to the portion and the second attribute.

13. The system of claim 9, wherein, the control circuitry is further configured to in response to receiving a selection of an alternate text in a particular user interface element: retrieve a second plurality of suggested alternate texts for the selected alternate text; and display, in the particular user interface element, for selection by the user, the selected alternate text and the second plurality of alternate texts.

14. The system of claim 13, the control circuitry is further configured to display, in the particular user interface element, for selection by the user, the portion of text originally displayed in the particular user interface element.

15. The system of claim 13, wherein the control circuitry is further configured to: receive a second selection of a second alternate text of the second plurality of suggested alternate texts; retrieve a third plurality of suggested alternate texts for the selected second alternate text of the second plurality of suggested alternate texts; and display, in the particular user interface element, for selection by the user, the selected second alternate text, the previously selected alternate text, the third plurality of suggested alternate texts, and the portion of text originally displayed in the particular user interface.

16. The system of claim 9, wherein the control circuitry is further configured to in response to receiving a selection of alternate text in a particular user interface element: retrieve a second plurality of suggested alternate texts for the portion displayed in at least one other user interface element; and display, in the at least one other user interface element, for selection by the user, the second plurality of alternate texts.

* * * * *